US007750284B2

(12) United States Patent
Cole et al.

(10) Patent No.: US 7,750,284 B2
(45) Date of Patent: Jul. 6, 2010

(54) MESOTUBE WITH HEADER INSULATOR

(75) Inventors: Barrett E. Cole, Bloomington, MN (US); Khanh Nguyen, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 10 days.

(21) Appl. No.: 12/180,368

(22) Filed: Jul. 25, 2008

(65) Prior Publication Data

US 2010/0019672 A1 Jan. 28, 2010

(51) Int. Cl.
*G01J 1/04* (2006.01)
*G01J 5/02* (2006.01)
*H01J 47/00* (2006.01)

(52) U.S. Cl. .............................. 250/214 VT; 313/539; 250/372

(58) Field of Classification Search ................. 250/207, 250/214 VT, 429, 372; 313/523, 539, 542, 313/544
See application file for complete search history.

(56) References Cited

U.S. PATENT DOCUMENTS 5,864,207 A * 1/1999 Kume et al. ................. 313/533
5,959,301 A * 9/1999 Warashina .................. 250/372
7,270,692 B2 9/2007 Gillingham et al. ........... 55/486
7,270,693 B2 9/2007 Chung et al. .................. 55/528
7,318,853 B2 1/2008 Chung et al. .................. 55/528
7,456,412 B2 * 11/2008 Cole et al. .................. 250/429
2007/0114264 A1 * 5/2007 Cole et al. ................. 228/49.5
2008/0252467 A1 * 10/2008 Cole et al. .................. 340/578
2008/0298934 A1 * 12/2008 Cole .......................... 414/217
2009/0072737 A1 * 3/2009 Cole .......................... 313/539
2009/0121406 A1 * 5/2009 Cole et al. .................. 269/296

* cited by examiner

*Primary Examiner*—John R Lee
(74) *Attorney, Agent, or Firm*—Kermit D. Lopez; Luis M. Ortiz; Kris T. Fredrick

(57) ABSTRACT

A mesotube apparatus is disclosed which includes a header insulator in order to avoid premature breakdown at lower voltage that occurs between a cathode and an anode in a discharge assembly. A chamber can be mounted on a header base and can be located away from plasma surrounded with dielectric so that breakdown occurs outside the normal voltage operating range. A number of feed-through pins associated with the header base can be electrically isolated from the header base by a dielectric insulator. The dielectric insulator can also be placed over the header base and topside of the chamber in order to passivate from stray electrons and plasma. The header base can be thin which allows welding of the anode and the cathode to the feed-through pins with a weld tool attached to the side of the feed-through pins. The chamber can be located on the header base by tightly fitting to the feed-through pins.

14 Claims, 2 Drawing Sheets

MESOTUBE WITH HEADER INSULATOR

TECHNICAL FIELD

Embodiments are generally related to mesotube. Embodiments are also related to mesotube with header insulator.

BACKGROUND OF THE INVENTION

Mesotube can be constructed of a sealed glass tube with a pair of electrodes and a reactive gas enclosed therein. The mesotube further includes a cathode, which is photo emissive (i.e. it emits electrons when illuminated) and an anode for collecting the electrons emitted by the cathode. A large voltage potential can be applied to and maintained between the cathode and the anode. Hence, in the presence of a flame, photons of a given energy level illuminate the cathode and cause electrons to be released and accelerated by the electric field, thereby ionizing the gas and inducing amplification until a much larger photocurrent measured in electrons is produced.

The cathode and the anode grids must be essentially parallel to each other and must be spaced by a precise distance to operate efficiently. Prior art approaches to accomplish precise placement and orientation of grids on the ends of header pins or electrodes utilize direct spot welding process on the header pins. The problem associated with such spot welding process is that the pins or electrodes can be held in place by insulators and such insulators do not survive the heat of the welding process. Production failure renders the use of such device much more expensive than necessary. Such approach, however, may cause premature breakdown at a lower voltage that occurs between the cathode and anode in the discharge assembly.

Based on the foregoing it is believed that a need therefore exists for an improved mesotube with header insulator in order to avoid premature breakdown at lower voltages as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved mesotube apparatus.

It is another aspect of the present invention to provide for an improved mesotube apparatus with header insulator in order to avoid premature breakdown at lower voltages.

The aforementioned aspects and other objectives and advantages can now be achieved as described herein. A mesotube apparatus is disclosed which can include a header insulator in order to avoid premature breakdown at lower voltage that occurs between a cathode and an anode in a discharge assembly. A chamber can be mounted on a header base and can be located away from plasma surrounded with dielectric so that breakdown occurs outside the normal voltage operating range. A number of feed-through pins associated with the header base can be electrically isolated from the header base by a dielectric insulator. The dielectric insulator can also be placed over the header base and topside of the chamber in order to passivate from stray electrons and plasma. The header base can be thin which allows welding of the anode and the cathode to the feed-through pins with a weld tool attached to the side of the feed-through pins. The chamber can be located on the header base by tightly fitting to the feed-through pins.

The header insulator prevents conductive paths from a pair of electrodes attached to the header base through the insulator. The dielectric insulator prevents striking of the electrons from discharge plasma to the header base. The dielectric insulator can be located far enough away from the plasma region so that the charge stored on the dielectric while it is in contact with the plasma does not have sufficient effect on subsequent discharges to reduce the breakdown potential. The diameter difference between the feed-through pins and the insulator outer diameter can be large enough in order to avoid breakdown related to cylindrical geometry.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
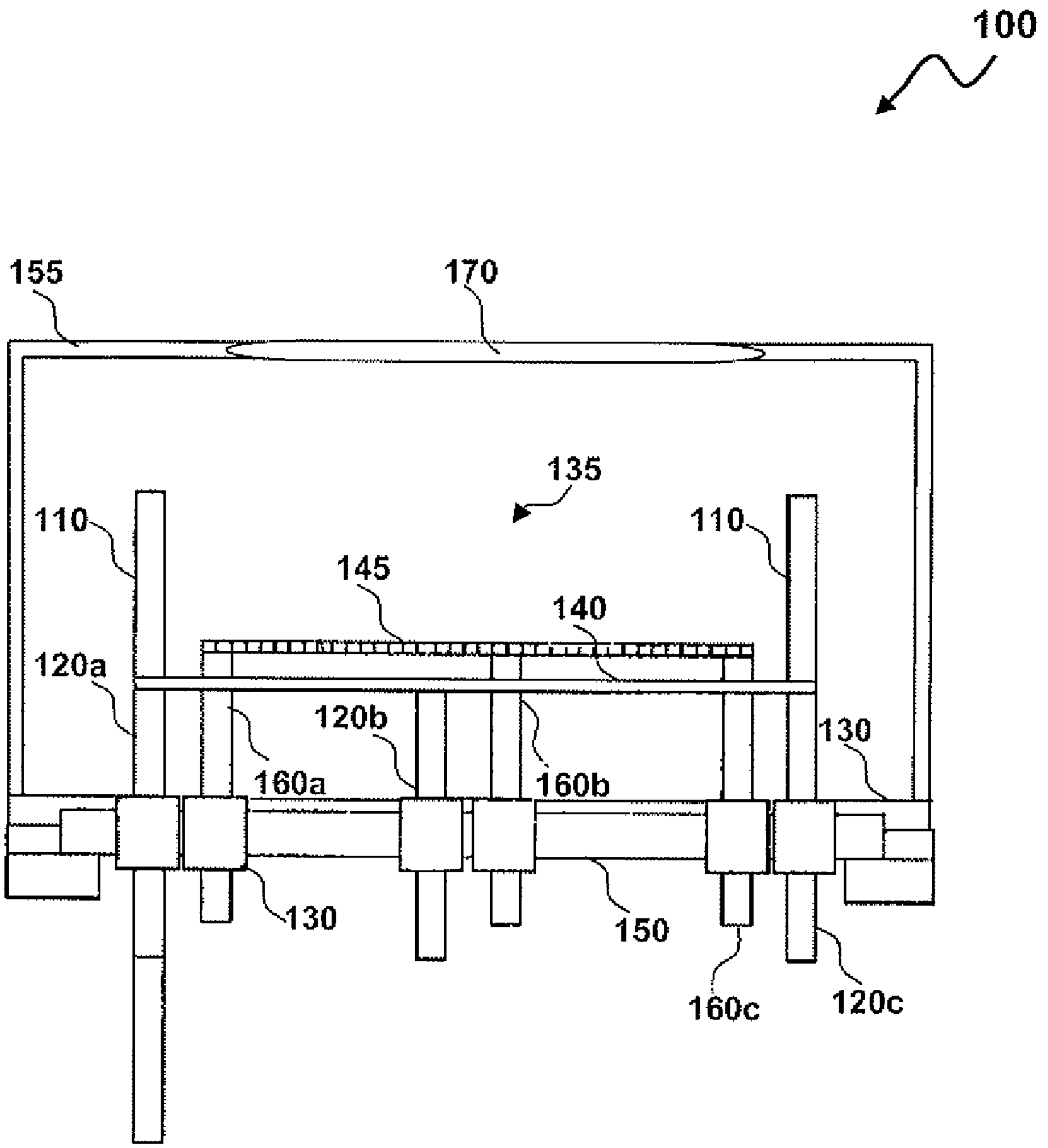
FIG. 1 illustrates a perspective view of a mesotube with a header insulator, in accordance with a preferred embodiment.

FIG. 1 illustrates a perspective view of a mesotube apparatus 100 associated with a header insulator, in accordance with a preferred embodiment. The mesotube apparatus 100 generally includes a header base 150 that can be utilized for supporting components such as a pair of electrodes 110, an anode grid 145 and a cathode plate 140. The apparatus 100 can be configured from a material such as, for example, quartz and can be filled with a gas at low pressure, which is ionized by any accelerated electrons. The gas generally acts as an insulator between the pair of electrodes 110 in the absence of accelerated electrons. The apparatus 100 further includes a chamber 155 mounted on the header base 150 and located away from plasma 135 that is surrounded with dielectric so that breakdown occurs well outside the normal voltage operating range. The mesotube apparatus 100, as described herein, is presented for general illustrative purposes only.

The cathode plate 140 can be placed on the header base 150 utilizing a first set of feed-through pins 120*a*, 120*b* and 120*c*. An electrical connection to the cathode plate 140 can be made through the first set of feed-through pins 120*a*, 120*b* and 120*c*. The anode grid 145 can be placed on the header base 150 making contact with a second set of feed-through pins 160*a*, 160*b* and 160*c*. The cathode plate 140 emits electrons when exposed to a flame. The electrons are accelerated from a negatively charged cathode plate 140 to the anode grid 145 charged to the discharge starting voltage and ionizing the plasma 135 filled in the apparatus 100 by colliding with molecules of the gas, generating both negative electrons and positive ions. The electrons are attracted to the anode grid 145 and the ions to the cathode plate 140, generating secondary electrons.

A gas discharge avalanche current flows between the cathode plate 140 and the anode grid 145. The cathode plate 140 and the anode grid 145 can be placed apart and are approximately parallel with each other. The feed-through pins 120*a*-120*c* and 160*a*-160*c* can be configured from a material such as, for example, a nickel plated Kovar, which is a Westinghouse trade name for an alloy of iron, nickel and cobalt that possess the same thermal expansion as glass and can be often utilized for glass-to-metal or ceramic-to-metal seals. It can be appreciated that other types of materials may also be utilized as desired without departing from the scope of the invention.

The feed-through pins 120*a*-120*c* and 160*a*-160*c* can be electrically isolated from the header base 150 with a dielectric insulator 130 such as, for example, ceramic, around the respective pins. An insulator 130 can also be placed over the header base 150 and topside of the chamber 155 in the form of a glass window 170 in order to passivate from stray electrons and plasma 135. The header base 150 can be thin which allows welding of the cathode plate 140 and the anode grid 145 to the feed-through pins 120*a*-120*c* and 160*a*-160*c* with a weld tool attached to the side of the feed-through pins 120*a*-120*c* and 160*a*-160*c*.

The chamber 155 can be located on the header base 150 by tightly fitting to the feed-through pins 120*a*-120*c* and 160*a*-160*c*. The chamber 155 can be configured from a material such as, for example, alumina, fused silica, or other insulators (e.g., glass). It can be appreciated that other types of materials may also be utilized as desired without departing from the scope of the invention. Since the dielectric insulator 130 is placed on the header base 150, feed-through pins 120*a*-120*c* and 160*a*-160*c* and the chamber 155 provide electrical isolation, which avoids premature breakdown at a lower voltage that occurs between the cathode plate 140 and the anode grid 145 in the apparatus 100.

Figure 2:
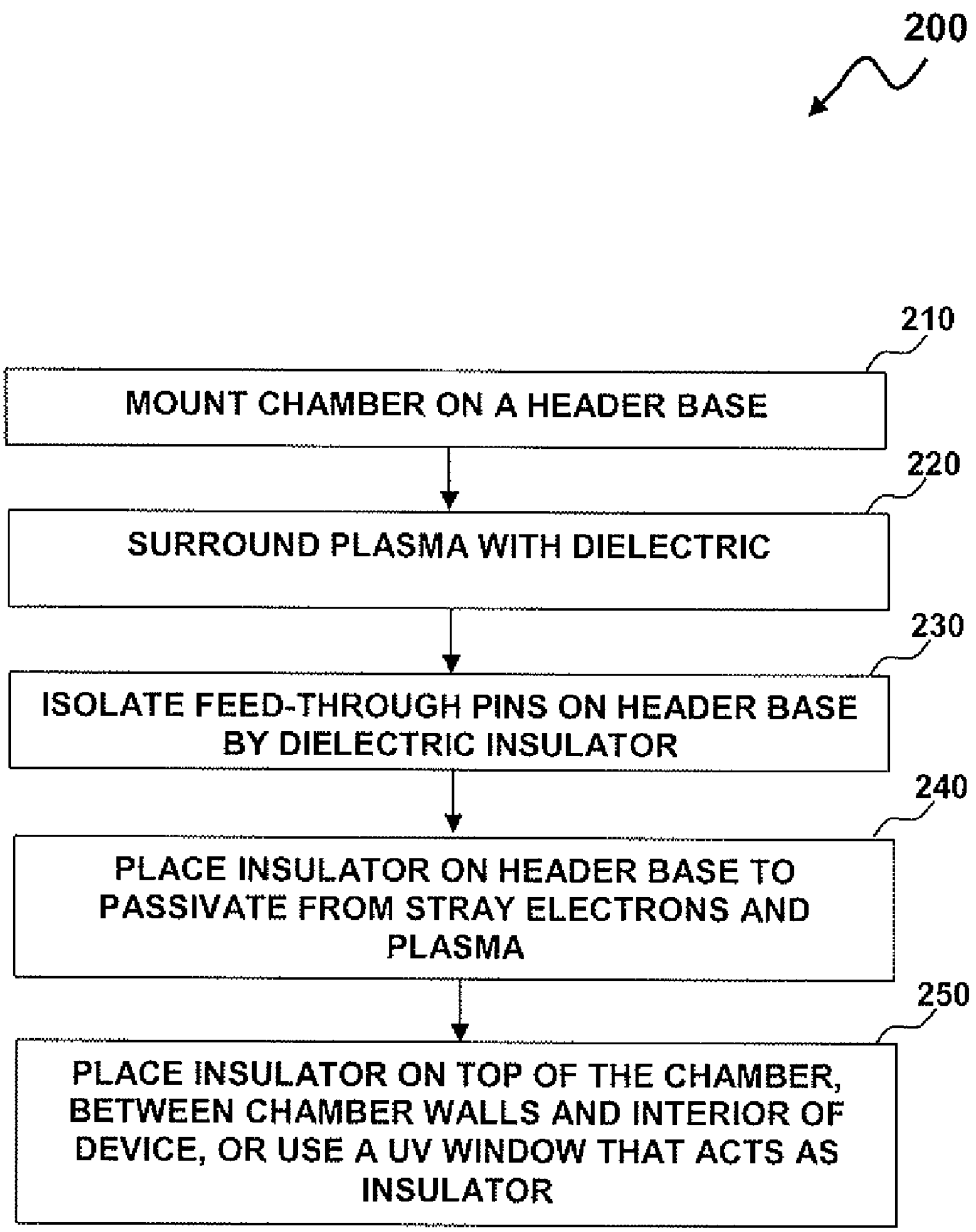
FIG. 2 illustrates a high level flow chart of operations illustrating logical operations of a method for constructing a mesotube with header insulator, in accordance with a preferred embodiment.

FIG. 2 illustrates a high level flow chart of operations illustrating logical operations of a method for constructing a mesotube apparatus 100 with header insulator 130, in accordance with a preferred embodiment. Note that in FIGS. 1-2, identical or similar blocks are generally indicated by identical reference numerals. A chamber 155 can be mounted on a header base 150, as depicted at block 210. Next, as illustrated at block 220, the plasma 135 can be surrounded with dielectric. In addition within step or after step 220, but optionally and not necessary, the chamber 155 can be located far away from the plasma 135 in order to keep electrons from discharge plasma 135 from striking the header base 150 associated with the chamber 155. The dielectric isolates the plasma 135 from local interaction to the metal wall of the chamber 155 in the localized breakdown region. The dielectric can be placed far enough away from the plasma region 135 so that the charge when stored on the dielectric while it is in contact with the plasma 135 does not possess sufficient effect on subsequent discharges to reduce the breakdown potential.

The feed-through pins 120*a*-120*c* and 160*a*-160*c* located on the header base 150 can be isolated by a dielectric insulator 130, as shown at block 230. The diameter difference between the pins 120*a*-120*c* and 160*a*-160*c* and the outer diameter of the insulator 130 can be large enough in order to avoid breakdown related to cylindrical geometry. The dielectric insulator 130 can be placed on the chamber floor 150 in order to passivate from stray electrons and plasma 135 and to provide no path for electrons being under the chamber 155, as depicted at block 240. In order to operate the apparatus 100 over the full desired voltage range, the dielectric insulator 130 can also be placed on the top of the chamber 155, between chamber walls and interior of the device or a UV window can be used that acts as an insulator, as shown at block 250.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A mesotube apparatus, comprising:

a header base;

a dielectric insulator atop said header base;

a cathode plate mounted above said header base and being welded to a first set of feed-through pins;

an anode grid mounted above said header base, separate from and parallel to said cathode plate, said anode grid being welded to a second set of feed-through pins;

said first set and second set of feed-through pins being electrically isolated from said header base by said dielectric insulator; and a chamber, having a window, mounted atop said header base encasing said cathode plate, said anode grid and said first set and second set of feed-through pins, said chamber being filled with plasma.

2. The apparatus of claim 1 wherein said header base is thin in order to weld said cathode plate and said anode grid with said first set and second set of feed-through pins.

3. The apparatus of claim 1 wherein said anode comprises a grid form.

4. The apparatus of claim 1 wherein said dielectric insulator passivates said header base from said plasma.

5. A mesotube apparatus, comprising:

a header base associated with a header insulator for mounting a cathode plate in parallel and apart from an anode grid mounted on the header insulator; and a pair of electrodes extending one each from the cathode plate and anode grid by means of a plurality of feed-through pins wherein said plurality of feed-through pins are electrically isolated from said header base by a dielectric insulator; and a chamber comprising said dielectric insulator mounted on said header base surrounded by a dielectric insulator in order to avoid premature breakdown wherein said chamber hermetically seals said cathode plate and said anode grid from the ambient environment external to said chamber.

6. The mesotube apparatus of claim 5 wherein the feed-through pins are comprised of nickel plated Kovar.

7. The mesotube apparatus of claim 5 wherein the feed-through pins are comprised of a mixture of iron alloy, nickel and cobalt that possess the same thermal expansion as glass and can be often utilized for glass-to-metal or ceramic-to-metal seals.

8. The mesotube apparatus of claim 5 wherein said header base is thin in order to weld said cathode plate and said anode grid with said plurality of feed-through pins.

9. The mesotube apparatus of claim 5 wherein said anode comprises a grid form.

10. The mesotube apparatus of claim 5 wherein said header insulator associated with said header base passivates said header base from said plasma.

11. A method for making a mesotube apparatus with a header insulator, comprising:

mounting a chamber including a metal wall on a header base;

providing plasma within said chamber and surrounding the plasma with a dielectric;

providing a plurality of feed-through pins on the header base and isolating said plurality of feed-through pins from said header base utilizing a dielectric insulator;

welding a cathode plate atop said plurality of feed-through pins utilizing a weld tool attached to said plurality of feed-through pins in contact with said cathode plate;

welding an anode grid, separate from and parallel to said cathode place, atop said plurality of feed-through pins utilizing a weld tool attached to said plurality of feed-through pins in contact with said anode grid.

12. The method of claim 11, wherein said dielectric insulator is placed on the top of said chamber in order to operate said mesotube apparatus over a full desired voltage range.

13. The method of claim 11 further comprising configuring said plurality of feed-through pins to comprise a mixture of iron alloy, nickel and cobalt that possess the same thermal expansion as glass and adaptable for use with glass-to-metal or ceramic-to-metal seals.

14. The method of claim 13 wherein said anode comprises a grid form.

* * * * *